United States Patent
Funahara et al.

(10) Patent No.: US 11,430,223 B2
(45) Date of Patent: Aug. 30, 2022

(54) VEHICLE DRIVING ASSIST APPARATUS

(71) Applicant: Toyota Jidosha Kabushiki Kaisha, Toyota (JP)

(72) Inventors: Nobutaka Funahara, Aichi-ken (JP); Hiroshi Harada, Nagakute (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 212 days.

(21) Appl. No.: 16/783,714

(22) Filed: Feb. 6, 2020

(65) Prior Publication Data

US 2020/0265242 A1  Aug. 20, 2020

(30) Foreign Application Priority Data

Feb. 15, 2019  (JP) .............................. JP2019-025007

(51) Int. Cl.
*G06V 20/56* (2022.01)
*B60W 40/112* (2012.01)
(Continued)

(52) U.S. Cl.
CPC ............. *G06V 20/56* (2022.01); *B60W 40/11* (2013.01); *B60W 40/112* (2013.01); *B60W 40/114* (2013.01)

(58) Field of Classification Search
CPC ... G06K 9/00791; G06K 9/209; B60W 40/11; B60W 40/112; B60W 40/114; G01S 2013/93185; G01S 2013/9319; G01S 2013/9323; G01S 7/4026; G01S 13/867; G01S 13/931; B60R 16/023; B60R 16/0232

See application file for complete search history.

(56) References Cited

U.S. PATENT DOCUMENTS 10,401,501 B2 *  9/2019  Wood ..................... G05D 1/024
2010/0318307 A1 * 12/2010  Schommer ............. G01B 11/27
702/94

(Continued)

FOREIGN PATENT DOCUMENTS

JP       2010-156609 A      7/2010

*Primary Examiner* — Joseph J Dallo
*Assistant Examiner* — Scott A Reinbold
(74) *Attorney, Agent, or Firm* — Dinsmore & Shohl LLP

(57) ABSTRACT

A vehicle driving assist apparatus comprises at least one surrounding sensor and at least one vehicle element. The surrounding sensor memorizes at least one axis difference adjustment value which adjusts at least one axis difference of a detection axis of the surrounding sensor relative to a predetermined base detection axis and provides the vehicle element with information on the axis difference adjustment value memorized in the surrounding sensor as adjustment value information. The vehicle element memorizes the axis difference adjustment value included in the adjustment value information provided from the surrounding sensor and provides the surrounding sensor with information on the axis difference adjustment value memorized in the vehicle element as the adjustment value information. The surrounding sensor memorizes the axis difference adjustment value included in the adjustment value information provided from the vehicle element when the axis difference adjustment value is not memorized in the surrounding sensor.

17 Claims, 5 Drawing Sheets

(51) Int. Cl.
*B60W 40/114* (2012.01)
*B60W 40/11* (2012.01)

(56) References Cited

U.S. PATENT DOCUMENTS

2014/0233023 A1* 8/2014 Soininen ............... G01S 13/867
    356/138
2020/0140715 A1* 5/2020 Onic ...................... D21H 17/24

\* cited by examiner

VEHICLE DRIVING ASSIST APPARATUS

CROSS-REFERENCE TO RELATED APPLICATIONS

This application claims priority to Japanese Patent Application No. 2019-025007 filed Feb. 15, 2019, which is incorporated herein by reference in its entirety include the specification, drawings, and abstract.

BACKGROUND

Field

The present disclosure relates to a vehicle driving assist apparatus for executing a driving assist control, based on surrounding information provided by at least one surrounding sensor for detecting surrounding situation around an own vehicle.

Description of the Related Art

There is known a vehicle driving assist apparatus which executes a driving assist control, based on surrounding information provided by surrounding sensors such as a camera sensor and a radar sensor which detect surrounding situations around an own vehicle. The surrounding sensors are mounted at predetermined parts of a body of the own vehicle. Each surrounding sensor detects target objects within a detection area of the surrounding sensor. The detection area is an area about a detection axis of the surrounding sensor. The detection axis of the camera sensor is an optical axis. The detection axis of the radar sensor is a radar axis. The detection axis of the surrounding sensor is a base which defines the detection area.

When an orientation of the detection axis does not align a proper orientation, a position of the detected target object in a coordinate system is not exact. Thus, amounts of differences between the orientation of the detection axis and the proper orientation are measured as axis difference amounts at a vehicle factory, and axis difference adjustment values corresponding to the measured axis difference amounts are memorized in the surrounding sensor. Thereby, the proper surrounding situation can be detected by correcting the position of the detected target object in the coordinate system by the axis difference adjustment values.

An operation for memorizing the axis difference adjustment values in the surrounding sensor is called an axis adjustment operation. The axis adjustment operation may be carried out by positioning a fixture such as a target board and a reflector in front of the vehicle as described in JP 2010-156609 A.

The surrounding sensor is mounted on the predetermined part of the body of the vehicle. Orientations of assembled bodies of the vehicles are different. Thus, the axis adjustment operation is required when the surrounding sensor is mounted on the body of the vehicle. The axis adjustment operation is carried out when the broken surrounding sensor is replaced with new surrounding sensor. Therefore, it takes a process to replace the broken surrounding sensor a long time. Further, the axis adjustment operation requires a wide operation area. Furthermore, the axis adjustment operation requires the fixture dedicated to carry out the axis adjustment operation.

Thus, a process to replace the broken surrounding sensor requires a lot of labor.

SUMMARY

The present disclosure has been made for solving problems described above. An object of the present disclosure is to provide a vehicle driving assist apparatus which can reduce the labor for replacing the surrounding sensors.

A vehicle driving assist apparatus according to the present disclosure comprises at least one surrounding sensor and an electronic control unit. The at least one surrounding sensor has a first detection axis and is mounted to a body of a vehicle at a predetermined first position. The at least one surrounding sensor is configured to (i) detect a situation surrounding the vehicle as a first detected situation within an area about the first detection axis and (ii) produce information on the first detected situation as first surrounding information. The electronic control unit executes a driving assist control to control a movement of the vehicle, based on the first surrounding information.

The vehicle driving assist apparatus further comprises at least one vehicle element mounted to the body of the vehicle in addition to the at least one surrounding sensor.

The at least one surrounding sensor is further configured to memorize at least one first axis difference adjustment value which adjusts at least one first axis difference of the first detection axis relative to a predetermined first base detection axis. The at least one surrounding sensor is further configured to produce the first surrounding information with adjusting the at least one first axis difference by the at least one first axis difference adjustment value. The at least one surrounding sensor is further configured to provide the at least one vehicle element with information on the at least one first axis difference adjustment value memorized in the at least one surrounding sensor as first adjustment value information.

The at least one vehicle element is configured to memorize the at least one first axis difference adjustment value included in the adjustment value information provided from the at least one surrounding sensor. The at least one vehicle element is configured to provide the at least one surrounding sensor with information on the at least one first axis difference adjustment value memorized in the at least one vehicle element as the first adjustment value information.

The at least one surrounding sensor is further configured to memorize the at least one first axis difference adjustment value included in the first adjustment value information provided from the at least one vehicle element when the at least one first axis difference adjustment value is not memorized in the at least one surrounding sensor.

The vehicle driving assist apparatus according to the present disclosure comprises the at least one surrounding sensor, the at least one vehicle element, and the electronic control unit. The surrounding sensor is mounted to the body of the vehicle at the predetermined first position and detects the situation surrounding the vehicle as the first detected situation. As described above, the surrounding sensor is mounted to the body of the vehicle at the predetermined first position. Orientations of assembled bodies of the vehicles are different. Thus, it is required to carry out an axis difference adjustment operation to (i) measure at least one first axis difference of the first detection axis of the surrounding sensor relative to the predetermined first base detection axis, (ii) acquire the at least one first axis difference adjustment value to adjust the measured axis difference, and (iii) memorize the acquired at least one first axis difference adjustment value. The axis difference adjustment operation is carried out at the vehicle factory.

The at least one first axis difference adjustment value may adjust the measured axis difference to zero. For example, when the orientation of the first detection axis of the surrounding sensor is different from an orientation of the predetermined first base detection axis upwards by an angle, this angle is the at least one first axis difference adjustment value. The situation surrounding the vehicle can be properly detected by correcting a position of a coordinate system by the at least one first axis difference adjustment value so as to change the orientation of the first detection axis downwards by the angle.

The surrounding sensor may be configured to (i) adjust the position of the coordinate system by the at least one first axis difference adjustment value so as to adjust the first axis difference of the first detection axis of the surrounding sensor to zero, (ii) acquire the first surrounding information, based on the adjusted position of the coordinate system. The electronic control unit executes the driving assist control, based on the first surrounding information produced by the surrounding sensor. The driving assist control may be a collision avoidance assist control to (i) alert a driver of the vehicle and (ii) control a braking force applied to the vehicle to avoid the vehicle from colliding with an obstacle detected by the surrounding sensor.

When the surrounding sensor is broken, the broken surrounding sensor is replaced with a new surrounding sensor. When the broken surrounding sensor is replaced with the new surrounding sensor, the new surrounding sensor is mounted to the body of the vehicle at the predetermined first position where the broken surrounding sensor was mounted. In this regard, the orientation of the body of the vehicle to which the new surrounding sensor is mounted, is the same as the orientation of the body of the vehicle to which the broken surrounding sensor is mounted. Therefore, when the new surrounding sensor is mounted to the body of the vehicle in the same manner as the broken surrounding sensor, the orientation of the first detection axis of the new surrounding sensor is the same as the orientation of the first detection axis of the broken surrounding sensor.

The vehicle driving assist apparatus according to the present disclosure comprises the vehicle element configured to memorize the at least one first axis difference adjustment value of the surrounding sensor. Therefore, there is no need to provide the vehicle with another element which memorizes the at least one first axis difference adjustment value of the surrounding sensor. Any of the vehicle elements already provided in the vehicle may be used as the vehicle element. The vehicle element is provided in the vehicle and is not the surrounding sensor. The vehicle element is configured to memorize the at least one first axis difference adjustment value included in the first adjustment value information provided from the surrounding sensor.

The vehicle element may be an element used in executing the driving assist control. For example, when two surrounding sensors are mounted to the body of the vehicle, the vehicle element may be one of the surrounding sensors. In this case, the surrounding sensor is a first surrounding sensor, and the vehicle element is a second surrounding sensor. The second surrounding sensor memorizes the at least one first axis difference adjustment value of the first surrounding sensor. When the second surrounding sensor as the vehicle element memorizes the at least one first axis difference adjustment value of the broken first surrounding sensor detached from the body of the vehicle, the at least one first axis difference adjustment value memorized in the second surrounding sensor as the vehicle element can be used as the at least one first axis difference adjustment value of the new first surrounding sensor mounted to the body of the vehicle. Thereby, the factory workers do not need to carry out the axis difference adjustment operation to (i) measure the at least one first axis difference of the first detection axis of the new first surrounding sensor, (ii) acquire the at least one first axis difference adjustment value to adjust the measured at least one first axis difference, and (iii) memorize the acquired at least one first axis difference adjustment value in the new first surrounding sensor as the at least one first axis difference adjustment value.

According to the present disclosure, the surrounding sensor is configured to provide the vehicle element with the first adjustment value information and receive the first adjustment information from the vehicle element. For example, when the axis difference adjustment operation is carried out to the surrounding sensor, the surrounding sensor memorizes the at least one first axis difference adjustment value and provides the vehicle element with the first adjustment value information. The vehicle element memorizes the at least one first axis difference adjustment value included in the first adjustment value information provided from the surrounding sensor.

When the broken surrounding sensor is replaced with the new surrounding sensor, the at least one first axis difference adjustment value is not memorized in the new surrounding sensor. When (i) the at least one first axis difference adjustment value is not memorized in the new surrounding sensor, and (ii) the at least one first axis difference adjustment value of the broken surrounding sensor is memorized in the vehicle element, the at least one first axis difference adjustment value of the broken surrounding sensor included in the first adjustment value information provided from the vehicle element is memorized in the new surrounding sensor. In this case, the first adjustment value information on the at least one first axis difference adjustment value of the previously-mounted surrounding sensor is provided from the vehicle element to the newly-mounted surrounding sensor. The first adjustment value information on the at least one first axis difference adjustment value of the previously-mounted surrounding sensor provided from the vehicle element is received by the newly-mounted surrounding sensor.

As a result, when the broken surrounding sensor is replaced with the new surrounding sensor, the at least one first axis difference adjustment value of the broken surrounding sensor is transferred to the new surrounding sensor. Thus, the factory workers do not need to carry out the axis difference adjustment operation with respect to the new surrounding sensor. Therefore, the labor to replace the surrounding sensors can be reduced.

According to an aspect of the present disclosure, the at least one vehicle element may be further configured to periodically provide the at least one surrounding sensor with the first adjustment value information.

In this aspect, the first adjustment value information is periodically provided from the vehicle element to the surrounding sensor after the at least one first axis difference adjustment value is memorized in the vehicle element. The first adjustment value information may be provided from the vehicle element to the surrounding sensor via an in-vehicle communication network such as a CAN. The surrounding sensor can determine that the at least one first axis difference adjustment value is memorized in the vehicle element when the first adjustment value information is provided from the vehicle element to the surrounding sensor.

When the broken surrounding sensor is replaced with the new surrounding sensor, the at least one first axis difference adjustment value is not memorized in the new surrounding sensor. Accordingly, when (i) the at least one first axis difference adjustment value is not memorized in the surrounding sensor, and (ii) the first adjustment value information is provided from the vehicle element to the surrounding sensor, the at least one first axis difference adjustment value included in the first-adjustment value information provided from the vehicle element to the surrounding sensor is memorized in the surrounding sensor. Thereby, the at least one first axis difference adjustment value of the surrounding sensor detached from the body of the vehicle is automatically transferred to the surrounding sensor newly mounted to the body of the vehicle. Thus, the labor to replace the surrounding sensors can be reduced.

According to another aspect of the present disclosure, the at least one surrounding sensor may be further configured to request to carry out an axis difference adjustment operation to memorize the at least one first axis difference adjustment value in the at least one surrounding sensor when (i) the at least one first axis difference adjustment value is not memorized in the at least one surrounding sensor, and (ii) the at least one vehicle element does not provide the at least one surrounding sensor with the first adjustment value information.

When the at least one first axis difference adjustment value is not memorized in the vehicle element, the first adjustment value information is not provided from the vehicle element to the surrounding sensor. For example, when (i) the vehicle element is broken, and (ii) the broken vehicle element is replaced with a new vehicle element, the at least one first axis difference adjustment value is not memorized in the new vehicle element. In this case, the first adjustment value information is not provided from the new vehicle element to the new surrounding sensor. In this case, the factory workers need to carry out the axis difference adjustment operation with respect to the new surrounding sensor.

In this aspect of the present disclosure, when (i) the at least one first axis difference adjustment value is not memorized in the surrounding sensor, and (ii) the first adjustment value information is not provided from the vehicle element to the surrounding sensor, it is requested to carry out the axis difference adjustment operation. In this case, a diagnosis error code which indicates that the first axis difference of the surrounding sensor has not been adjusted, may be generated to request to carry out the axis difference adjustment operation. Thereby, the vehicle driving assist apparatus can request the factory workers to carry out the axis difference adjustment operation with respect to the new surrounding sensor.

According to further another aspect of the present disclosure, the at least one surrounding sensor may be configured to adjust the at least one first axis difference by adjusting a position of a coordinate system, based on the first detection axis to a position of a coordinate system, based on the predetermined first base detection axis by the at least one first axis difference adjustment value.

According to further another aspect of the present disclosure, the at least one first axis difference may include at least one of (i) a difference in a pitch angle between the first detection axis and the predetermined first base detection axis, (ii) a difference in a yaw angle between the first detection axis and the predetermined first base detection axis, and (iii) a difference in a roll angle between the first detection axis and the predetermined first base detection axis.

According to further another aspect of the present disclosure, the at least one surrounding sensor may include a camera sensor having an optical axis as the first detection axis. In this case, the camera sensor may be configured to (i) take images of a view surrounding the vehicle within an area about the optical axis and (ii) detect the situation surrounding the vehicle as the first detected situation, based on the images taken by the camera sensor.

According to further another aspect of the present disclosure, the at least vehicle element may be further configured to (i) detect the situation surrounding the vehicle as a second detected situation and (ii) produce information on the second detected situation as second surrounding information. In this case, the electronic control unit may be configured to execute the driving assist control, based on the first surrounding information and the second surrounding information.

According to further another aspect of the present disclosure, the at least one vehicle element may include a radar sensor which detects the situation surrounding the vehicle as the second detected situation.

According to further another aspect of the present disclosure, the radar sensor may have a second detection axis. In this case, the radar sensor may be further configured to detect the situation surrounding the vehicle as the second detected situation within an area about the second detection axis. The radar sensor may be further configured to memorize at least one second axis difference adjustment value which adjusts at least one second axis difference of the second detection axis relative to a predetermined second base detection axis. The radar sensor may be further configured to produce the second surrounding information with adjusting the at least one second axis difference by the at least one second axis difference adjustment value. The radar sensor may be further configured to provide the at least one surrounding sensor with information on the at least one second axis difference adjustment value memorized in the radar sensor as second adjustment value information.

In this aspect, the at least one surrounding sensor may be configured to memorize the at least one second axis difference adjustment value included in the second adjustment value information provided from the radar sensor. The at least one surrounding sensor may be further configured to provide the radar sensor with the second adjustment value information on the at least one second axis difference adjustment value memorized in the at least one surrounding sensor.

In this aspect, the radar sensor may be further configured to memorize the at least one second axis difference adjustment value included in the second adjustment value information provided from the at least one surrounding sensor when the at least one second axis difference adjustment value is not memorized in the radar sensor.

According to further another aspect of the present disclosure, the radar sensor may be configured to adjust the at least one second axis difference by adjusting a position of a coordinate system, based on the second detection axis to a position of a coordinate system, based on the predetermined second base detection axis by the at least one second axis difference adjustment value.

According to further another aspect of the present disclosure, the at least one second axis difference may include at least one of (i) a difference in a pitch angle between the second detection axis and the predetermined second base detection axis, (ii) a difference in a yaw angle between the second detection axis and the predetermined second base detection axis, and (iii) a difference in a roll angle between the second detection axis and the predetermined second base detection axis.

When the vehicle driving assist apparatus comprises the camera sensor as the surrounding sensor which detects the situation surrounding the vehicle, the electronic control unit executes the driving assist control, based on the first surrounding information produced by the camera sensor.

When the vehicle driving assist apparatus comprises the radar sensor as the vehicle element which detects the situation surrounding the vehicle, the electronic control unit executes the driving assist control, based on the second surrounding information produced by the radar sensor.

When the vehicle driving assist apparatus comprises (i) the camera sensor which detects the situation surrounding the vehicle as the surrounding sensor and (ii) the radar sensor which detects the situation surrounding the vehicle as the vehicle element, the electronic control unit executes the driving assist control, based on the first surrounding information produced by the camera sensor and the second surrounding information produced by the radar sensor. In this case, the electronic control unit can execute the driving assist control with high accuracy.

The camera sensor and the radar sensor may be the surrounding sensors. The radar sensor functions as the vehicle element. The radar sensor (i) receives the first adjustment value information on the at least one first axis difference adjustment value of the camera sensor (in particular, an optical axis difference adjustment value of the camera sensor) from the camera sensor and (ii) memorizes the at least one first axis difference adjustment value included in the received first adjustment value information.

When (i) the surrounding sensor is the camera sensor, and (ii) the axis difference adjustment operation with respect to the camera sensor is finished, the camera sensor provides the radar sensor with the first adjustment value information. The radar sensor memorizes the at least one first axis difference adjustment value included in the first adjustment value information provided from the camera sensor. In addition, the radar sensor provides the camera sensor with the first adjustment information on the at least one first axis difference adjustment value memorized in the radar sensor. Accordingly, when (i) the at least one first axis difference adjustment value is not memorized in the camera sensor, and (ii) the first adjustment value information is provided from the radar sensor to the camera sensor, the camera sensor memorizes the at least one first axis difference adjustment value included in the first adjustment value information provided from the radar sensor.

When the camera sensor is broken and is replaced with a new camera sensor, the at least one first axis difference adjustment value of the new camera sensor is not memorized in the new camera sensor. When the at least one first axis difference adjustment value of the broken camera sensor is memorized in the radar sensor, the radar sensor provides the new camera sensor with the first adjustment value information on the at least one first axis difference adjustment value of the broken camera sensor. The new camera sensor memorizes the at least one first axis difference adjustment value included in the first adjustment value information provided from the radar sensor.

As a result, when the broken camera sensor is replaced with the new camera sensor, the at least one first axis difference adjustment value of the broken camera sensor is transferred from the radar sensor to the new camera sensor. Therefore, the factory workers do not need to carry out the axis difference adjustment operation with respect to the new camera sensor. Thus, the labor to replace the camera sensors can be reduced.

According to further another aspect of the present disclosure, the at least one surrounding sensor may include a first surrounding sensor having the first detection axis and mounted to the body of the vehicle at the predetermined first position. In this case, the first surrounding sensor may be configured to (i) detect the situation surrounding the vehicle as the first detected situation within the area about the first detection axis and (ii) produce the information on the first detected situation as the first surrounding information.

In this aspect, the at least one vehicle element may include a second surrounding sensor having a second detection axis and mounted to the body of the vehicle at a predetermined second position different from the predetermined first position. In this case, the second surrounding sensor may be configured to (i) detect the situation surrounding the vehicle as a second detected situation within an area about the second detection axis and (ii) produce information on the second detected situation as second surrounding information.

In this aspect, the electronic control unit may be further configured to execute the driving assist control, based on the first surrounding information and the second surrounding information.

According to further another aspect of the present disclosure, the second surrounding sensor may be further configured to memorize at least one second axis difference adjustment value which adjusts at least one second axis difference of the second detection axis relative to a predetermined second base detection axis. The second surrounding sensor may be further configured to produce the second surrounding information with adjusting the at least one second axis difference by the at least one second axis difference adjustment value. The second surrounding sensor may be further configured to provide the first surrounding sensor with information on the at least one second axis difference adjustment value memorized in the second surrounding sensor as second adjustment value information.

In this aspect, the first surrounding sensor may be configured to memorize the at least one second axis difference adjustment value included in the second adjustment value information provided from the second surrounding sensor. The first surrounding sensor may be further configured to provide the second surrounding sensor with information on the at least one second axis difference adjustment value memorized in the first surrounding sensor as the second adjustment value information.

In this aspect, the second surrounding sensor may be further configured to memorize the at least one second axis difference adjustment value included in the second adjustment value information provided from the first surrounding sensor when the at least one second axis difference adjustment value is not memorized in the second surrounding sensor.

According to further another aspect of the present disclosure, the second surrounding sensor may be configured to adjust the at least one second axis difference by adjusting a position of a coordinate system, based on the second detection axis to a position of a coordinate system, based on the predetermined second base detection axis by the at least one second axis difference adjustment value.

According to further another aspect of the present disclosure, the at least one second axis difference may include at least on of (i) a difference in a pitch angle between the second detection axis and the predetermined second base detection axis, (ii) a difference in a yaw angle between the second detection axis and the predetermined second base detection axis, and (iii) a difference in a roll angle between the second detection axis and the predetermined second base detection axis.

According to further another aspect of the present disclosure, the driving assist control may be a control to automatically control one or more of acceleration of the vehicle, deceleration of the vehicle, and steering of the vehicle.

Elements of the present disclosure are not limited to elements of embodiments and modified examples of the present disclosure described along with the drawings. The other objects, features and accompanied advantages of the present disclosure can be easily understood from the embodiments and the modified examples of the present disclosure.

DESCRIPTION OF THE EMBODIMENTS

Below, a vehicle driving assist apparatus according to an embodiment of the present disclosure will be described with reference to the drawings.

Figure 1:
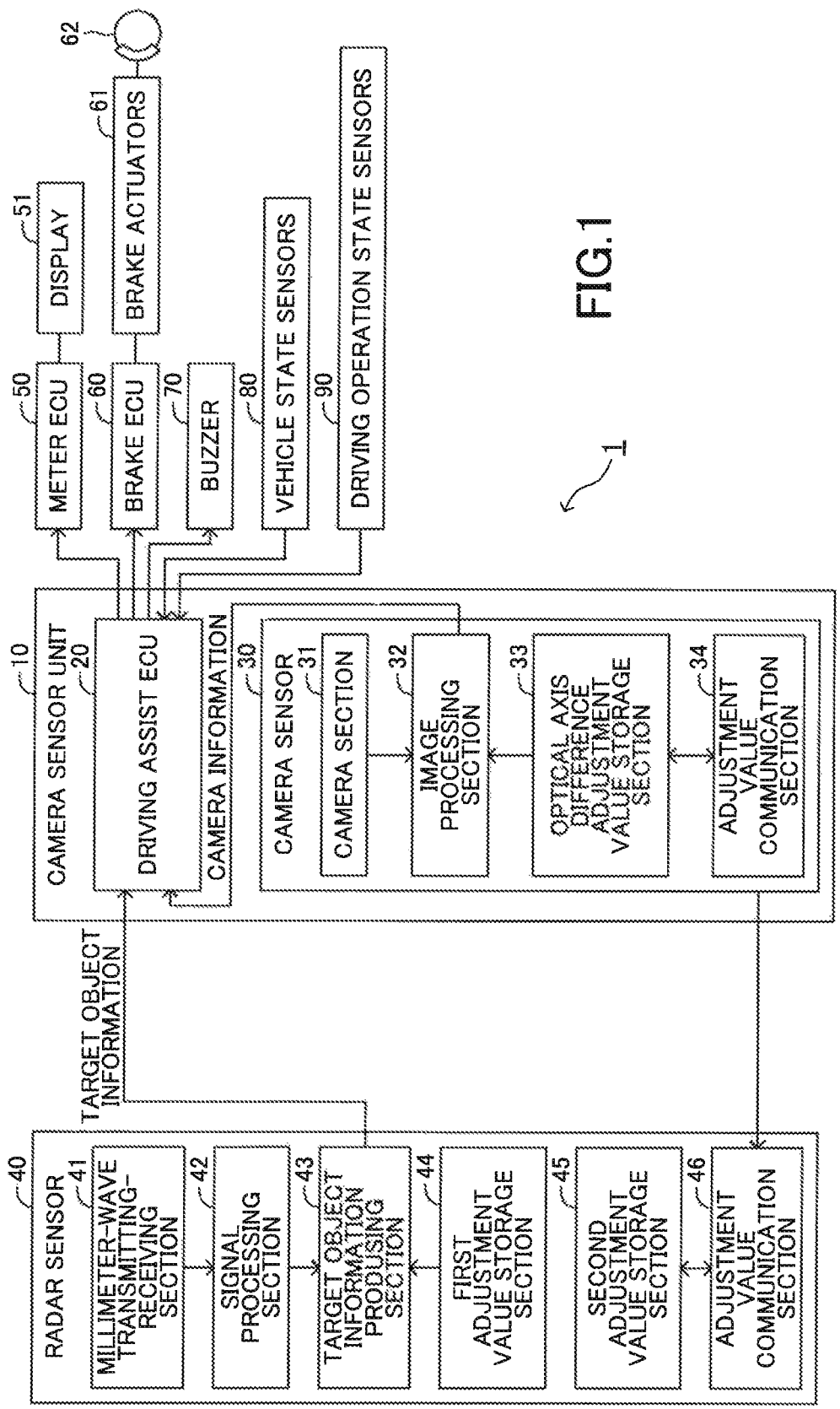
FIG. 1 is a view which shows a general configuration of a system of a vehicle driving assist apparatus according to an embodiment of the present disclosure.

FIG. 1 shows a general configuration of a vehicle driving assist apparatus 1 according to the embodiment of the present disclosure. The vehicle driving assist apparatus 1 is mounted on a vehicle. Hereinafter, in some cases, the vehicle on which the vehicle driving assist apparatus 1 is mounted, will be referred to as "the own vehicle" in order to distinguish the own vehicle from vehicles other than the own vehicle.

The vehicle driving assist apparatus 1 includes a camera sensor unit 10 and a radar sensor 40. The camera sensor unit 10 includes a driving assist ECU 20, a camera sensor 30, and a casing. The driving assist ECU 20 and the camera sensor 30 are housed in the casing. The camera sensor unit 10 is constituted as one unit including the driving assist ECU 20, the camera sensor 30 and the casing. The radar sensor 40, a meter ECU 50, a brake ECU 60, a buzzer 70, vehicle state sensors 80, and driving operation state sensors 90 are electrically connected to the driving assist ECU 20 via a CAN (Controller Area Network).

The word "ECU" stands for "electronic control unit". Each of the driving assist ECU 20, the meter ECU 50, and the brake ECU 60 includes a micro-computer as a main component. The micro-computer includes a CPU, a ROM, a RAM, a non-volatile memory, and an interface I/F. The CPU is configured to realize various functions by executing instructions, programs, and routines stored in the ROM. One ECU may function as some or all of the driving assist ECU 20, the meter ECU 50, and the brake ECU 60.

The camera sensor unit 10 is mounted to an upper part of a front windshield glass at a side of an interior of the vehicle. In particular, a bracket (not shown) is mounted to the upper part of the front windshield glass. The camera sensor unit 10 is mounted to the bracket by fitting the camera sensor unit 10 to the bracket. Thereby, the camera sensor unit 10 is mounted at a predetermined position of the upper part of the front wind shield glass.

The camera sensor 30 includes a camera section 31, an image processing section 32, an optical axis difference adjustment value storage section 33, and an adjustment value communication section 34.

The camera section 31 is, for example, a monocular camera. An image taking area of the camera section 31 is an area defined by a predetermined angle about the optical axis of the camera section 31. The camera section 31 takes images of a view within the image taking area ahead of the own vehicle. The camera section 31 provides the taken images to the image processing section 32.

The image processing section 32 recognizes (i) lane markings provided on a road and (ii) standing objects ahead of the own vehicle, based on the images taken by the camera section 31. The image processing section 32 provides information on the recognized lane markings to the driving assist ECU 20 as lane marking information and provides information on the recognized standing objects to the driving assist ECU 20 as standing object information with a predetermined cycle. The lane marking information is information indicating a positional relationship between the own vehicle and each detected lane marking. The positional relationship includes an orientation of each detected lane marking with respect to the own vehicle. The standing object information is information indicating (i) a kind of each detected standing object, (ii) a size of each detected standing object, and (iii) a positional relationship between the own vehicle and each detected standing object. Hereinafter, the information produced by the image processing section 32 and provided to the driving assist ECU 20 will be referred to as "the camera information" or "the surrounding information."

The image processing section 32 corrects a position of a coordinate system in the images with optical axis difference adjustment values to produce the camera information. The optical axis difference adjustment value storage section 33 is a device which memorizes the optical axis difference adjustment values. The optical axis difference adjustment values are values corresponding to difference amounts of the optical axis of the camera section 31 relative to a base optical axis. The optical axis difference adjustment values are acquired by carrying out an optical axis difference adjustment operation for each vehicle. The acquired optical axis difference adjustment values are memorized in the optical axis difference adjustment value storage section 33. The optical axis difference adjustment values correspond to at least one first axis difference adjustment value of the present disclosure.

The optical axis difference adjustment operation includes, for example, (i) a process to position a target board at a predetermined position ahead of the vehicle, (ii) a process to take an image of the target board by the camera sensor 30, (iii) a process to measure the difference amounts of the optical axis of the camera sensor 30, based on a position of a center of the target board in the coordinate system in the taken image, (iv) a process to acquire the optical axis difference adjustment values corresponding to the measured difference amounts, and (v) a process to memorize the acquired optical axis difference adjustment values in the optical axis difference adjustment value storage section 33. When the optical axis of the camera sensor 30 does not align an intended direction, the position of the coordinate system in the image taken by the camera sensor 30 is corrected by the optical axis difference adjustment values to eliminate the difference amounts of the optical axis of the camera sensor 30. Thereby, the exact camera information including the lane marking information and the standing object information is provided to the driving assist ECU 20. Any of the known optical axis difference adjustment operations may be used as the optical axis difference adjustment operation of this embodiment.

The adjustment value communication section 34 includes a communication circuit. The communication circuit outputs and receives information on the optical axis difference adjustment values of the camera sensor 30 via the CAN. The adjustment value communication section 34 has a function to send out the information on the optical axis difference adjustment values of the surrounding sensor 30 (in this embodiment, to the radar sensor 40). The information on the optical axis difference adjustment values of the camera sensor 30 is information on the optical axis difference adjustment values memorized in the optical axis difference adjustment value storage section 33. In addition, the adjustment value communication section 34 has a function to (i) receive the information on the optical axis difference adjustment values of the camera sensor 30 provided from outside (in this embodiment, from the radar sensor 40) and (ii) memorize the optical difference adjustment values included in the information provided from outside in the optical axis difference adjustment value storage section 33. The information on the optical axis difference adjustment values of the camera sensor 30 provided from outside is information on the optical axis difference adjustment values of the camera sensor 30 memorized in a second adjustment value storage section 45 described later.

The radar sensor 40 is electrically connected to the camera sensor unit 10 via the CAN. The radar sensor 40 is mounted to a vehicle body member at a predetermined position corresponding a front center end of the own vehicle. The front center end is an end of the own vehicle located at a front end of the own vehicle on a center position along a width direction of the own vehicle. For example, the radar sensor 40 is mounted to the vehicle body member at a back side of an emblem plate. The emblem plate is provided at a center of a front grille. The radar sensor 40 is, for example, a millimeter-wave radar sensor which detects the standing objects ahead of the own vehicle. The radar sensor 40 includes a millimeter-wave transmitting/receiving section 41, a signal processing section 42, a target object information producing section 43, a first adjustment value storage section 44, a second adjustment value storage section 45, and an adjustment value communication section 46.

The millimeter-wave transmitting/receiving section 41 transmits millimeter waves. The transmitted millimeter waves propagate in a space expanding by a predetermined angle about a radar axis. The radar axis extends in a forward direction of the own vehicle. The millimeter-wave transmitting/receiving section 41 modulates frequency of a reference signal to produce a signal having the frequency changing with time, i.e., produce a millimeter wave. The reference signal has a predetermined frequency. The millimeter-wave transmitting/receiving section 41 transmits the produced millimeter wave as a transmitted signal via a transmitting antenna. The transmitted millimeter wave is reflected by an object such as another vehicle, walking persons, and two-wheel vehicles. The millimeter-wave transmitting/receiving section 41 receives the millimeter wave propagating in a space within the detection area via receiving antennas. Therefore, the millimeter-wave transmitting/receiving section 41 receives the millimeter wave reflected by the object as a received signal when the object exists in the detection area.

The signal processing section 42 mixes the transmitted signals produced by the millimeter-wave transmitting/receiving section 41 and the received signals reflected by the objects and received by the millimeter-wave transmitting/receiving section 41. The signal processing section 42 takes a difference in frequency between the transmitted signal and the received signal to produce a beat signal. The signal processing section 42 produces the beat signal for each channel, i.e., each receiving antenna. The signal processing section 42 provides a radar detection signal including the produced beat signal to the target object information producing section 43.

The target object information producing section 43 is a calculation circuit including a micro-computer as a main component. The target object information producing section 43 carries out a frequency analysis to the radar detection signal, for example, by the fast Fourier transformation to acquire a time between a point of time of transmitting the transmitted signal and a point of time of receiving the received signal as a delay time. The target object information producing section 43 calculates a distance between the radar sensor 40 and the object, based on the acquired delay time. The target object information producing section 43 calculates a relative movement speed of the object to the radar sensor 40, based on a difference in frequency between the transmitted signal and the received signal. In addition, the target object information producing section 43 calculates a horizontal direction of the object relative to the radar sensor 40 and a vertical direction (i.e., an angle of elevation) of the object relative to the radar sensor 40, based on a signal phase difference between the channels.

Hereinafter, the information on the objects calculated by the target object information producing section 43 will be referred to as "the target object information." The target object information is information on the relative position of each object to the radar sensor 40 and the relative movement speed of the object to the radar sensor 40. The relative position is defined by the relative distance of the object to the radar sensor 40 and the relative direction of the object to the radar sensor 40. Hereinafter, in some cases, the object detected by the radar sensor 40 will be referred to as "the target object." The target object information producing section 43 provides the calculated target object information (i.e., the calculated surrounding information) to the driving assist ECU 20 via the CAN.

When the target object information producing section 43 produces the target object information, the target object information producing section 43 reads out the radar axis difference adjustment values memorized in the first adjustment value storage section 44 and corrects the position of the object in the coordinate system with the radar axis difference adjustment values. The radar axis difference adjustment values correspond to the difference amounts of the radar axis of the radar sensor 40 relative to a base radar axis. The radar axis difference adjustment values are memorized in the first adjustment value storage section 44 by carrying out a radar axis difference adjustment operation to each vehicle at the vehicle factory. Various operations are known as the radar axis difference adjustment operation. Any of the known operations may be used as the radar axis difference adjustment operation of this embodiment.

The radar axis difference adjustment values may not be memorized in the radar sensor 40 when the orientation of the radar sensor 40 is physically adjusted, for example, by adjustment screws such that the measured difference amounts of the radar axis of the radar sensor 40 become zero at the vehicle factory. In this case, the first adjustment value storage section 44 may be omitted.

The adjustment value communication section 46 includes a communication circuit which sends and receives information on the optical axis difference adjustment values of the camera sensor 30 via the CAN. The adjustment value communication section 46 has a function to (i) receive the information on the optical axis difference adjustment values of the camera sensor 30 from outside (in this embodiment, from the camera sensor 30) and (ii) memorize the optical axis difference adjustment values included in the received information in the second adjustment value storage section 45. In addition, the adjustment value communication section 46 has a function to send out the information on the optical axis difference adjustment values of the camera sensor 30 (in this embodiment, to the camera sensor 30). The information on the optical axis difference adjustment values of the camera sensor 30 provided from the adjustment value communication section 46 is information on the optical axis difference adjustment values of the camera sensor 30 memorized in the second adjustment value storage section 45.

The second adjustment value storage section 45 is a device which memorizes the optical axis difference adjustment values of the camera sensor 30 included in the information received by the adjustment value communication section 46.

As understood from the above, the camera sensor 30 and the radar sensor 40 can communicate the information on the optical axis difference adjustment values of the camera sensor 30 with each other. A process to communicate the information on the optical axis difference adjustment values of the camera sensor 30 between the camera sensor 30 and the radar sensor 40 will be described later.

The meter ECU 50 is electrically connected to the display 51. The display 51 is, for example, a multi information display which is provided in front of a driver's seat and informs the driver of various information by using characters. The meter ECU 50 controls a display of the display 51 in accordance with a display command sent from the driving assist ECU 20.

The brake ECU 60 is electrically connected to the brake actuator 61. The brake actuator 61 is provided in a hydraulic circuit between a master cylinder (not shown) and each friction brake mechanism 62. The master cylinder compresses hydraulic oil by a pressing force applied to the brake pedal. The friction brake mechanisms 62 are provided to a left front wheel, a right front wheel, a left rear wheel, and a right rear wheel, respectively. Each brake mechanism 62 has a brake disc and a brake caliper. The brake disc is secured to the corresponding wheel. The brake caliper is secured to the body of the own vehicle. The brake actuator 61 adjusts hydraulic pressure to be supplied to a wheel cylinder in accordance with a command sent from the brake ECU 60. The wheel cylinder is provided in the brake caliper. The brake actuator 61 activates the wheel cylinder by the adjusted hydraulic pressure to press the brake pad to the brake disc, thereby to generate friction braking force. The brake ECU 60 can control the braking force applied to the own vehicle by controlling the brake actuator 61.

For example, when the brake ECU 60 receives a compressing assist command from the driving assist ECU 20, the brake ECU 60 controls the brake actuator 61 to generate the friction braking force greater than the friction braking force generated by a normal operation to the brake pedal. In other words, the brake ECU 60 increases a ratio of the friction braking force to a pressing stroke of the brake pedal to a ratio greater than a ratio normally accomplished when the brake ECU 60 does not receive the compressing assist command. When the brake ECU 60 receives an automatic brake command from the driving assist ECU 20, the brake ECU 60 controls the brake actuator 61 to generate a predetermined friction braking force, independently of whether the driver operates the brake pedal.

When the buzzer 70 receives a sound generation command from the driving assist ECU 20, the buzzer 70 is driven in accordance with the sound generation command, thereby to generate buzzer sound in a manner specified by the sound generation command. The buzzer sound provides the driver with attention.

The vehicle state sensors 80 are various kinds of sensors which detect vehicle states. The vehicle state sensors 80 are, for example, a vehicle movement speed sensor, vehicle wheel rotation speed sensors, a longitudinal acceleration sensor, a lateral acceleration sensor, and a yaw rate sensor. The vehicle movement speed sensor detects a movement speed of the own vehicle. Each vehicle wheel rotation speed sensor detects a rotation speed of the corresponding wheel of the own vehicle. The longitudinal acceleration sensor detects a longitudinal acceleration of the own vehicle. The lateral acceleration sensor detects a lateral acceleration of the own vehicle. The yaw rate sensor detects a yaw rate of the own vehicle.

The driving operation state sensors 90 are various kinds of sensors which detect driving operation states performed by the driver. The driving operation state sensors 90 are, for example, an acceleration pedal operation amount sensor, a brake pedal operation amount sensor, a brake switch, a steering angle sensor, a steering torque sensor, a turn signal lever operation sensor, and a shift position sensor. The acceleration pedal operation amount sensor detects an operation amount of the acceleration pedal. The brake pedal operation amount sensor detects an operation amount of the brake pedal. The brake switch detects an operation to the brake pedal. The steering angle sensor detects a steering angle. The steering torque sensor detects a steering torque. The turn signal lever operation sensor detects an operation to a turn signal lever. The shift position sensor detects a shift position of a transmission.

The driving assist ECU 20 executes a driving assist control to assist a driving operation performed by the driver. In this embodiment, the driving assist ECU 20 executes a collision avoidance assist control as the driving assist control. The collision avoidance assist control is known. Below, the collision avoidance assist control will be briefly described.

The driving assist ECU 20 specifies an obstacle ahead of the own vehicle and determines a possibility that the own vehicle collides with the specified obstacle, based on the camera information and the target object information. The camera information is provided from the camera sensor 30 to the driving assist ECU 20. The target object information is provided from the radar sensor 40 to the driving assist ECU 20. For example, the driving assist ECU 20 calculates a predicted collision time TTC(=Dr/Vr), based on the relative distance Dr and the relative movement speed Vr. The predicted collision time TTC is a time predicted to take the own vehicle to move from the present position to the obstacle to collide with the obstacle. The obstacle exists ahead of the own vehicle. The relative distance Dr is a distance between the own vehicle and the obstacle. The relative movement speed Vr is a difference in movement speed between the own vehicle and the obstacle. The predicted collision time TTC is used as an index value indicating the possibility that the own vehicle collides with the obstacle. The possibility that the own vehicle collides with the obstacle increases as the predicted collision time TTC decreases. In other words, emergency level increases as the predicted collision time TTC decreases.

When the predicted collision time TTC decreases to an alert level, the driving assist ECU 20 controls the buzzer 70 to generate the sounds intermittently and sends a brake induction command to the meter ECU 50 to display "Braking!" by the characters on the display 51 to alert the driver. Furthermore, when the brake pedal is pressed, the driving assist ECU 20 sends the compressing assist command to the brake ECU 60 to assist compressing the brake hydraulic oil to increase the pressure of the brake hydraulic oil, thereby to increase brake effect. In addition, when the predicted collision time TTC further decreases to an automatic brake level, the driving assist ECU 20 sends the automatic brake command to the brake ECU 60 to generate the predetermined friction braking force, independently of the driver's operation to the brake pedal.

The driver's driving operation for avoiding a collision of the own vehicle with the obstacle is assisted, or damage derived from the collision of the own vehicle with the obstacle is reduced by the collision avoidance assist control.

The driving assist ECU 20 may be configured to execute, for example, the other driving assist control such as inter-vehicle distance keeping movement assist control in addition to or in place of the collision avoidance assist control. The inter-vehicle distance keeping movement assist control is a control to move the own vehicle, following a vehicle moving in front of the own vehicle with keeping a predetermined inter-vehicle distance. When the driving assist ECU 20 starts executing the inter-vehicle distance keeping movement assist control, the driving assist ECU 20 selects a preceding vehicle among vehicles moving ahead of the own vehicle and calculates a target acceleration or deceleration for keeping the inter-vehicle distance between the own vehicle and the preceding vehicle at a target inter-vehicle distance, based on the camera information provided from the camera sensor 30 and the target object information provided from the radar sensor 40. The preceding vehicle is a vehicle nearest the own vehicle. The driving assist ECU 20 sends an acceleration/deceleration command to the engine ECU (not shown). The acceleration/deceleration command indicates the target acceleration or deceleration. Thereby, the own vehicle is automatically moved, following the preceding vehicle with keeping the appropriate inter-vehicle distance.

The driving assist ECU 20 may be configured to execute, for example, a lane keeping assist control to move the own vehicle along a center line of a lane. When the driving assist ECU 20 starts executing the lane keeping assist control, the driving assist ECU 20 calculates a target steering angle for moving the own vehicle along the center line of the lane, based on the lane marking information provided from the camera sensor 30 and sends a steering command to an electric power steering ECU (not shown). The steering command indicates the target steering angle. The electric power steering ECU controls a driving of an assist motor to control the steering angle to the target steering angle. Thereby, the own vehicle is moved along the center line of the lane.

<Optical Axis Difference Adjustment Value Memorization Process>

For example, the camera sensor 30 may be broken. In this case, the broken camera sensor 30 needs to be replaced with new camera sensor 30. In order to replace the broken camera sensor 30 with the new camera sensor 30, the camera sensor unit 10 is detached from the sensor mounting bracket. Then, a new camera sensor unit 10 is fitted to the sensor mounting bracket. Thereby, a process to replace the broken camera sensor unit 10 with the new camera sensor unit 10 is finished. Hereinafter, the process to replace the camera sensor unit 10 with the new camera sensor unit 10 will be referred to as "the sensor replacement process."

When the sensor replacement process is carried out, the optical axis difference adjustment values are not memorized in the optical axis difference adjustment value storage section 33 of the new camera sensor 30. Therefore, conventionally, the factory workers carry out the optical axis difference adjustment operation at the vehicle factory after the factory workers replace the camera sensors 30. The optical axis difference adjustment operation includes (i) a process to position the target board in front of the own vehicle, (ii) a process to measure the different amounts of the optical axis of the new camera sensor 30 relative to the base optical axis, and (iii) a process to memorize the optical axis difference adjustment values corresponding to the measured difference amounts in the optical axis difference adjustment value storage section 33. As described above, the sensor replacement process leads to the optical axis difference adjustment operation.

In this connection, the sensor replacement process includes a process to fit the new camera sensor unit 10 to the sensor mounting bracket to which the broken camera sensor unit 10 has been fitted. The sensor mounting bracket is not replaced and is still secured to the front windshield glass. Thus, the new camera sensor unit 10 is fitted to the existing (or common) sensor mounting bracket. Thus, the orientation of the optical axis of the camera sensor 30 to the body of the own vehicle does not change after the sensor replacement process is carried out.

The vehicle driving assist apparatus 1 according to this embodiment is configured to memorize the optical axis difference adjustment values of the camera sensor 30 in the other element (corresponding to a vehicle element according to the present disclosure) in advance. The vehicle driving assist apparatus 1 reads the optical axis difference adjustment values memorized in the other element and memorizes the read optical axis difference adjustment values in the optical axis difference adjustment value storage section 33 of the new camera sensor 30 after the sensor replacement process is carried out. Thereby, the optical axis difference adjustment operation does not need to be carried out even when the sensor replacement process is carried out. In this embodiment, the other element is the radar sensor 40. In this connection, the other element may be any element which is provided to electrically communicate with the camera sensor 30. The radar sensor 40 is electrically connected to the camera sensor unit 10 via the CAN to communicate with the camera sensor unit 10. Therefore, the camera sensor 30 and the radar sensor 40 can communicate the information on the optical axis difference adjustment values with each other by using the existing communication function.

Figure 2:
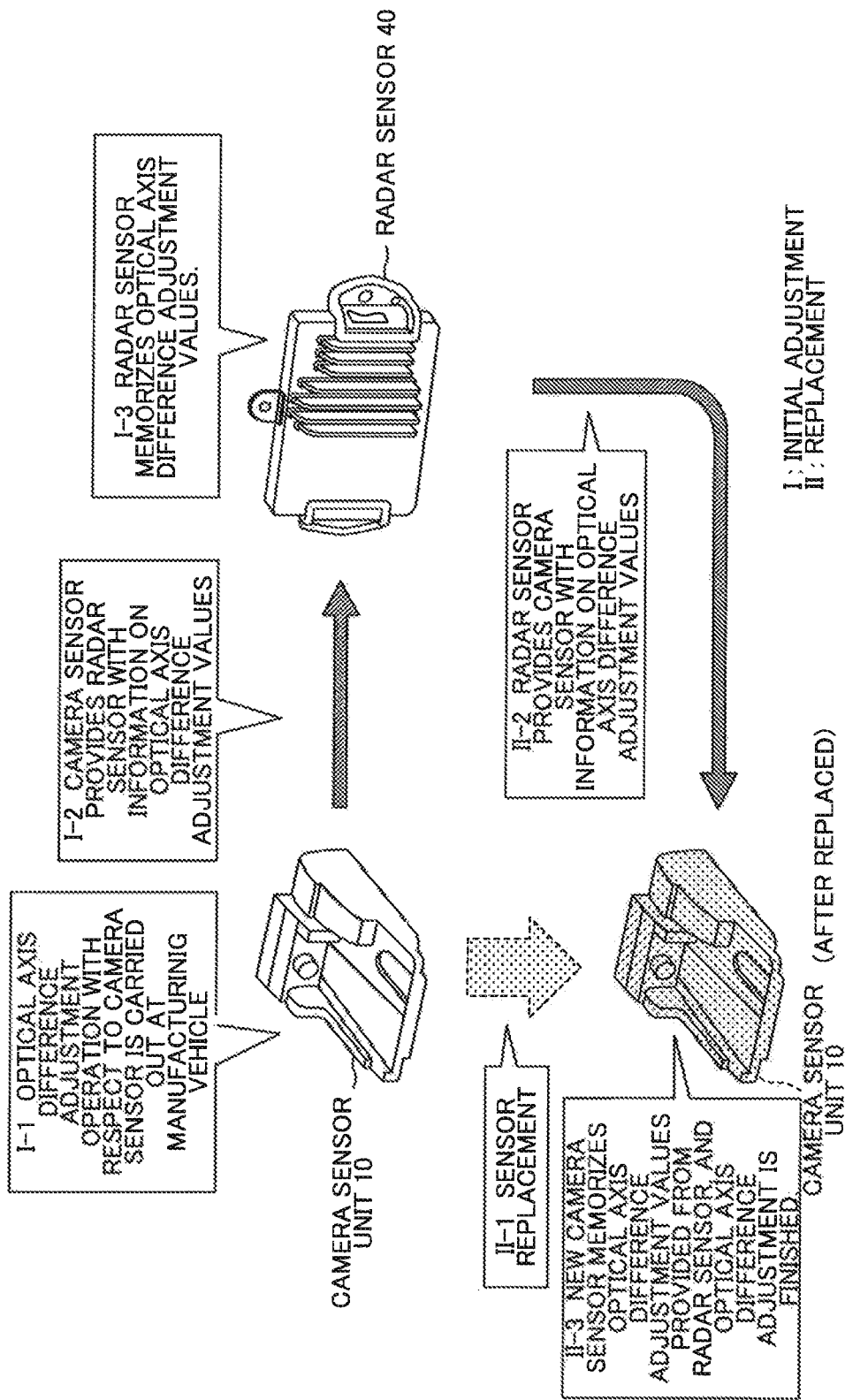
FIG. 2 is a view which shows processes to transfer optical assist adjustment values of an old camera sensor to a new camera sensor.

FIG. 2 is a view which shows a process to transfer the optical axis difference adjustment values of the old sensor camera 30 to the new camera sensor 30 via the other element (in this embodiment, the radar sensor 40).

I-1. The optical axis difference adjustment operation is carried out when the vehicle is manufactured. At this moment, the optical axis difference adjustment values of the camera sensor 30 are memorized in the camera sensor 30.

I-2. The camera sensor 30 provides the radar sensor 40 with the information on the optical axis difference adjustment values memorized in the camera sensor 30 after the optical axis difference adjustment operation is finished.

I-3. The radar sensor 40 receives the information on the optical axis difference adjustment values provided from the camera sensor 30 and memorizes the optical axis difference adjustment values included in the received information.

When the camera sensor 30 is broken, the optical axis difference adjustment values of the broken camera sensor 30 are transferred to the new camera sensor 30 as follows.

II-1. The sensor replacement process is carried out by the factory workers.

II-2. The radar sensor 40 provides the new camera sensor 30 with the information on the optical axis difference adjustment values of the camera sensor 30 memorized in the radar sensor 40 (i.e., the information on the optical axis difference adjustment values provided from the broken camera sensor 30 before the sensor replacement process is carried out).

II-3. The new camera sensor 30 receives the information on the optical axis difference adjustment values provided from the radar sensor 40 and memorizes the optical axis difference adjustment values included in the received information. Thereby, the optical axis difference adjustment operation is finished.

As described above, even when the sensor replacement process is carried out, the optical axis difference adjustment values of the old camera sensor 30 at shipment of the vehicle are transferred to the new camera sensor 30. Thus, the factory workers do not need to carry out the optical axis difference adjustment operation.

Below, a process to transfer the optical axis difference adjustment values to the new camera sensor 30 will be described.

Figure 3:
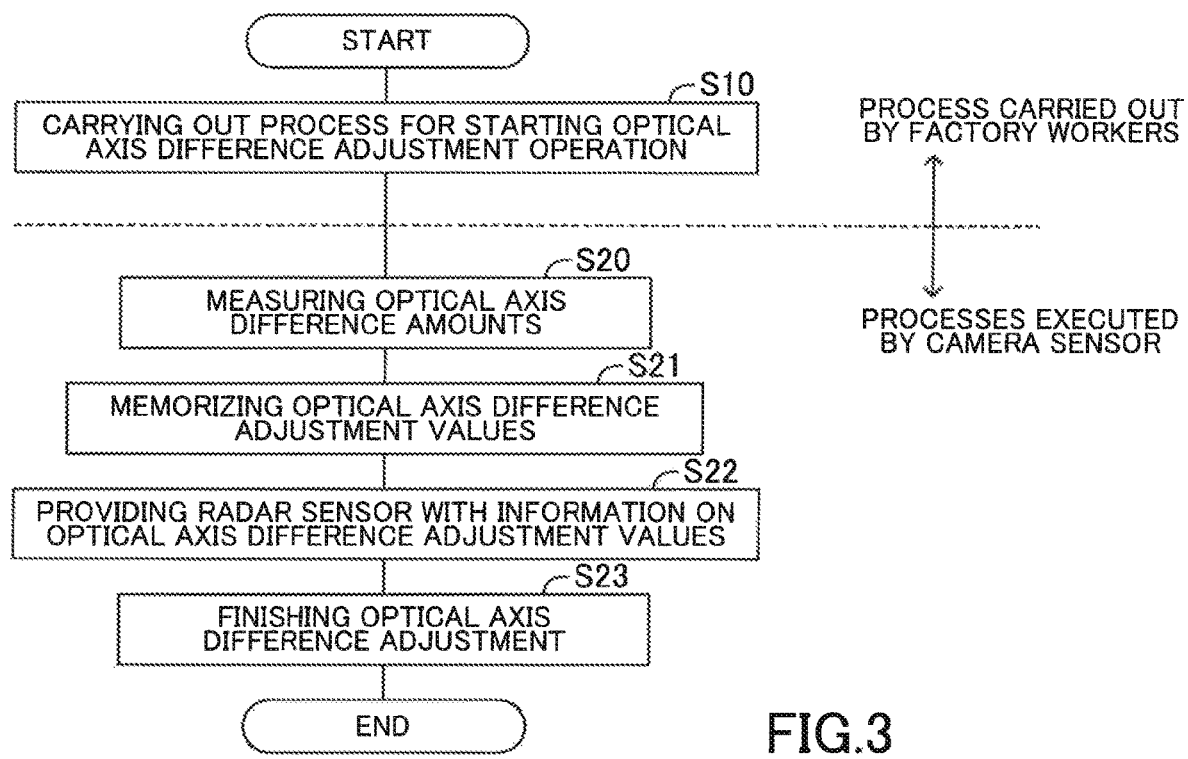
FIG. 3 is a view which shows a flowchart of processes to adjust an optical axis of the camera sensor executed at a vehicle factory.

FIG. 3 is a view which shows a flowchart of processes to adjust the optical axis difference of the camera sensor 30 carried out and executed at the vehicle factory. First, the factory workers carry out a process for starting the optical axis difference adjustment operation (a step 510). In particular, the factory workers position the target board at the predetermined position ahead of the vehicle and carry out the process for starting the optical axis difference adjustment operation by using a diagnosis tool. The positional relationship between the vehicle and the target board impacts considerably on a measurement accuracy of the difference amounts of the optical axis of the camera sensor 30 relative to the base optical axis. Thus, the factory workers are required to accurately position the target board at the predetermined position ahead of the vehicle.

When the factory workers carry out the process for starting the optical axis difference adjustment operation, the optical axis difference adjustment command is sent to the camera sensor 30. The camera sensor 30 proceeds with the process to a step S20 to (i) take an image of the target board, (ii) acquire the position of the center of the target board in the coordinate system in the taken image, and (iii) measure the difference amounts of the optical axis of the camera sensor 30, based on the acquired position in the coordinate system. The difference amounts of the optical axis of the camera sensor 30 are, for example, (i) a difference amount of a pitch angle of the optical axis of the camera sensor 30 relative to a base pitch angle, (ii) a difference amount of a yaw angle of the optical axis of the camera sensor 30 relative to a base yaw angle, and (iii) a difference amount of a roll angle of the optical axis of the camera sensor 30 relative to a base roll angle. The difference amounts of the optical axis of the camera sensor 30 relative to the base optical axis correspond to the optical axis difference adjustment values of the camera sensor 30. A process of the step S20 is executed, for example, by the image processing section 32.

Next, the camera sensor 30 proceeds with the process to a step S21 to memorize in the optical axis difference adjustment value storage section 33, the optical axis difference adjustment values corresponding to the difference amounts of the optical axis of the camera sensor 30 measured as described above.

Next, the camera sensor 30 proceeds with the process to a step S22 to provide the radar sensor 40 with the information on the optical axis difference adjustment values memorized in the camera sensor 30. A process of the step S22 is executed by the adjustment value communication section 34. After the camera sensor 30 provides the radar sensor 40 with the information on the optical axis difference adjustment values, the camera sensor 30 proceeds with the process to a step S23 to end the optical axis difference adjustment operation. An error code which indicates that the optical axis differences have not been adjusted to zero, is memorized in the camera sensor 30 as a diagnosis code before the optical axis difference adjustment operation is ended. After a process of the step S23 is executed, the error code which indicates that the optical axis differences have not been adjusted to zero, is eliminated from the camera sensor 30.

Figure 4:
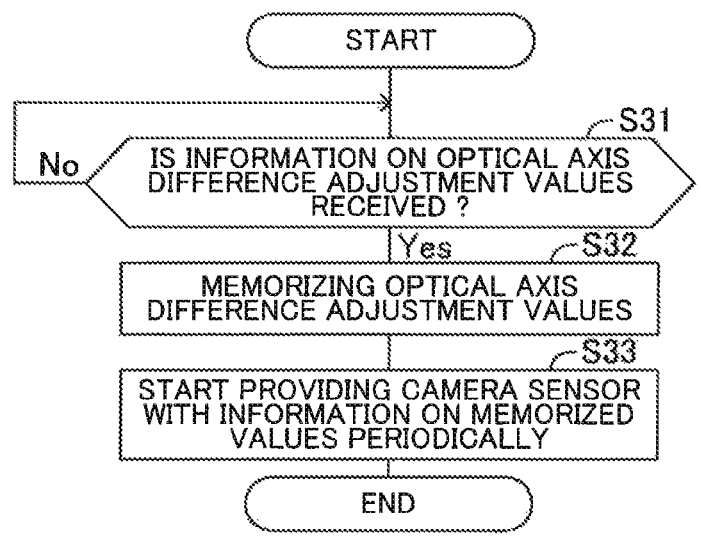
FIG. 4 is a view which shows a flowchart of an optical axis difference adjustment value communication routine.

The radar sensor 40 is configured to execute an optical axis difference adjustment value communication routine shown in FIG. 4. The optical axis difference adjustment value communication routine is executed by the adjustment value communication section 46 of the radar sensor 40.

When the radar sensor 40 starts executing the optical axis difference adjustment value communication routine, the radar sensor 40 (in particular, the adjustment value communication section 46) proceeds with the process to a step S31 to determine whether the radar sensor 40 receives the information on the optical axis difference adjustment values from the camera sensor 30. The radar sensor 40 repeatedly executes a determination process of the step S31 until the radar sensor 40 receives the information on the optical axis difference adjustment values from the camera sensor 30.

When the radar sensor 40 receives the information on the optical axis difference adjustment values from the camera sensor 30 while the radar sensor 40 repeatedly executes the determination process of the step S31, the radar sensor 40 determines "Yes" at the step S31 and proceeds with the process to a step S32 to memorize the optical axis difference adjustment values included in the received information in the second adjustment value storage section 45.

Next, the radar sensor 40 proceeds with the process to a step S33 to start periodically providing the information on the optical axis difference adjustment values memorized in the second adjustment value storage section 45. Then, the radar sensor 40 terminates the optical axis difference adjustment value communication routine. Therefore, after (i) the radar sensor 40 memorizes the optical axis difference adjustment values in the second adjustment value storage section 45, and (ii) the optical axis difference adjustment value communication routine is terminated, the radar sensor 40 provides the information on the optical axis difference adjustment values memorized in the radar sensor 40 with a predetermined short interval.

Next, a process executed after the broken camera sensor 30 is replaced with a new camera sensor 30, will be described. When the factory workers finish the sensor replacement process, the factory workers confirm whether the optical axis difference adjustment values are memorized in the new camera sensor 30 by using the diagnosis tool. The optical axis difference adjustment values may not be memorized in the new camera sensor 30. Thus, the factory workers can confirm the diagnosis error code which indicates that the optical axis differences have not been adjusted to zero by using the diagnosis tool.

Figure 5:
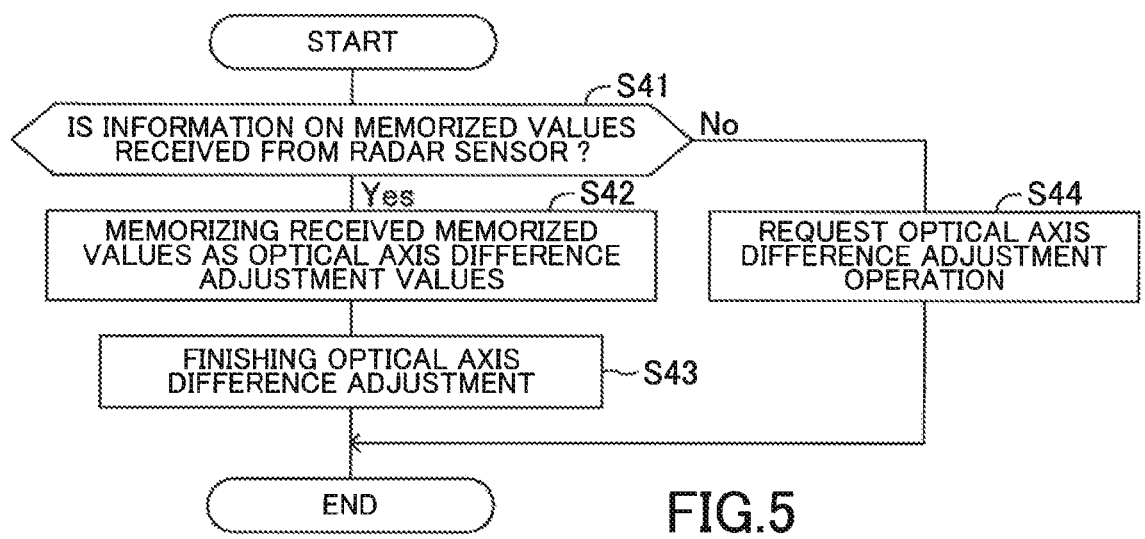
FIG. 5 is a view which shows a flowchart of an adjustment value reading routine.

When the factory workers confirm the diagnosis error code which indicates that the optical axis differences have not been adjusted to zero, the factory workers carry out an operation to start reading the optical axis difference adjustment values by using the diagnosis tool. Thereby, an adjustment value reading routing shown in FIG. 5 starts.

When the camera sensor 30 receives an optical axis difference adjustment value reading start command from the diagnosis tool, the camera sensor 30 starts executing the adjustment value reading routine. The adjustment value reading routine is executed by the adjustment value communication section 34 of the camera sensor 30.

When the adjustment value reading routine starts, the camera sensor 30 proceeds with the process to a step S41 to determine whether to receive the information on the optical axis difference adjustment values from the radar sensor 40. The information provided from the radar sensor 40 is information on the optical axis difference adjustment values of the old camera sensor 30 memorized in the second adjustment value storage section 45 of the radar sensor 40. The camera sensor 30 executes a process of the step 541 for a predetermined time longer than the predetermined short interval with which the adjustment value communication section 46 of the radar sensor 40 outputs the information on memorized values. The memorized values are the optical axis difference adjustment values memorized in the second adjustment value storage section 45. Thereby, when the camera sensor 30 has executed the process of the step 541 for the predetermined time and has not received the information on the memorized values, the camera sensor 30 determines that the radar sensor 40 does not provide the new camera sensor 30 with the information on the memorized values.

When the adjustment value communication section 46 of the radar sensor 40 provides the adjustment value communication section 34 of the camera sensor 30 with the information on the memorized values with the predetermined short interval, the camera sensor 30 determines "Yes" at the step 541. In other words, when the optical axis difference adjustment values of the camera sensor 30 is memorized in the radar sensor 40 as the memorized values, the camera sensor 30 determines "Yes" at the step S41. On the other hand, when the adjustment value communication section 46 of the radar sensor 40 does not provide the adjustment value communication section 34 of the camera sensor 30 with the information on the memorized values with the predetermined short interval, the camera sensor 30 determines "No" at the step 541. In other words, when the optical axis difference adjustment values of the camera sensor 30 is not memorize in the radar sensor 40, the camera sensor 30 determines "No" at the step 541.

When the camera sensor 30 receives the information on the memorized values from the radar sensor 40, the camera sensor 30 determines "Yes" at the step 541 and proceeds with the process to a step 542 to memorize the memorized values included in the received information in the optical axis difference adjustment value storage section 33 as the own optical axis difference adjustment values.

Then, the camera sensor 30 proceeds with the process to a step 543 to (i) delete the diagnosis error code which indicates that the optical axis differences have not been adjusted to zero and (ii) terminate the optical axis difference adjustment operation. Thereby, the diagnosis tool realizes that the optical axis difference adjustment is finished and, for example, indicates that the optical axis difference adjustment is finished on a diagnosis display.

On the other hand, when the information on the memorized values has not been provided from the radar sensor 40 to the camera sensor 30, the camera sensor 30 determines "No" at the step S41 and then proceeds with the process to a step S44 to request to carry out the optical axis difference adjustment operation. In this case, for example, the camera sensor 30 does not delete the diagnosis error code which indicates that the optical axis difference adjustment has not been finished. In other words, the camera sensor 30 keeps the diagnosis error code which indicates that the optical axis difference adjustment has not been finished. Thereby, the diagnosis error code which indicates that the optical axis difference adjustment has not been finished, has not been deleted, and thus the diagnosis tool realizes that the optical axis difference adjustment operation is requested and, for example, indicates that the optical axis difference adjustment operation is requested on the diagnosis display.

After the camera sensor 30 executes a process of the step 543 or the step 544, the camera sensor 30 terminates the adjustment value reading routine.

When the sensor replacement process is carried out, the optical axis difference adjustment values are usually not memorized in the new camera sensor 30. Therefore, when the optical axis difference adjustment values are memorized in the new camera sensor 30, it can be estimated that the optical axis difference adjustment values memorized in the new camera sensor 30 are wrong. In other words, when the factory workers do not confirm the diagnosis error code which indicates that the optical axis adjustment has not been finished, it can be estimated that the optical axis difference adjustment values memorized in the new camera sensor 30 are wrong. In this case, even when the optical axis difference adjustment values are memorized in the radar sensor 40, reliability of the optical axis difference adjustment values memorized in the radar sensor 40 is low. Accordingly, in this case, the factory workers carry out the optical axis difference adjustment operation at the vehicle factory without executing the adjustment value reading routine. Therefore, the adjustment value reading routine is executed only when the optical axis difference adjustment values are not memorized in the new camera sensor 30.

As described above, according to the vehicle driving assist apparatus 1, the information on the optical axis difference adjustment values is provided to the radar sensor 40 when the optical axis difference adjustment operation is carried out with respect to the camera sensor 30. Thereby, the optical axis difference adjustment values are memorized in the camera sensor 30 as well as the radar sensor 40. After the radar sensor 40 memorizes the optical axis difference adjustment values, the radar sensor 40 periodically provides the camera sensor 30 with the information on the optical axis difference adjustment values memorized in the radar sensor 40 via the CAN. In particular, the radar sensor 40 provides the camera sensor 30 with the information on the memorized optical axis difference adjustment values memorized in the radar sensor 40 via the CAN with the predetermine short interval. Thereafter, even when the camera sensor 30 is replaced with the new camera sensor 30, the new camera sensor 30 receives the information on the memorized optical axis difference adjustment values provided to the CAN and memorizes the received optical axis difference adjustment values as the own optical axis difference adjustment values.

Therefore, according to the embodiment, the information on the optical axis difference adjustment values of the old camera sensor 30 are automatically transferred to the new camera sensor 30. Therefore, even when the camera sensor 30 is replaced with the new camera sensor 30 after the optical axis difference adjustment operation is carried out once, there is no need to carry out the optical axis difference adjustment operation. As a result, the factory workers do not need to carry out the optical axis difference adjustment operation when the factory workers replace the camera sensors 30 with the new camera sensor 30. Processes required to replace the camera sensors 30 can be reduced.

The vehicle driving assist apparatus 1 according to the embodiment has been described. The present disclosure is not limited to the embodiment, and various modifications can be applied to the embodiment without departing the scope of the present disclosure.

For example, the vehicle driving assist apparatus 1 according to the embodiment is configured to memorize the optical axis difference adjustment values of the camera sensor 30 in the radar sensor 40. In this connection, an element in which the optical axis difference adjustment values are memorized, is not limited to the radar sensor 40. The element in which the optical axis difference adjustment values are memorized, may be any of elements which can communicate with the camera sensor 30. For example, the vehicle driving assist apparatus 1 may be configured to memorize the optical axis difference adjustment values in the vehicle element such as any of the brake ECU 60, the meter ECU 50, the engine ECU (not shown), and the electric power steering ECU (not shown) which control at least one actuator when the driving assist control is executed.

The present disclosure is not limited to an apparatus configured to memorize the optical axis difference adjustment values of the camera sensor 30 in the other element. The present disclosure may be applied to an apparatus configured to memorize radar axis difference adjustment values of the radar sensor 40 in an element of the vehicle which can electrically communicate with the radar sensor 40. In this case, the radar sensor 40 corresponds to the surrounding sensor of the present disclosure. For example, the present disclosure may be applied to an apparatus configured to memorize the radar axis difference adjustment values of the radar sensor 40 in the vehicle element such as any of the driving assist ECU 20, the camera sensor 30, the brake ECU 60, the meter ECU 50, the engine ECU (not shown), and the electric power steering ECU (not shown). In this case, there is no need to carry out a radar axis difference adjustment operation when the radar sensor 40 is replaced with a new radar sensor 40.

According to the embodiment, the driving assist ECU 20 and the camera sensor 30 are integrated into one unit. In this connection, the driving assist ECU 20 and the camera sensor 30 may be provided separately. In this case, the vehicle driving assist apparatus 1 may be configured to memorize the optical axis difference adjustment values of the camera sensor 30 in the driving assist ECU 20 as the vehicle element.

The invention claimed is:

1. A vehicle driving assist apparatus comprising:
at least one surrounding sensor having a first detection axis and mounted to a body of a vehicle at a predetermined first position, the at least one surrounding sensor being configured to (i) detect a situation surrounding the vehicle as a first detected situation within an area about the first detection axis and (ii) produce information on the first detected situation as first surrounding information; and an electronic control unit which executes a driving assist control to control a movement of the vehicle, based on the first surrounding information;

wherein:

the vehicle driving assist apparatus further comprises at least one vehicle electronic control unit mounted to the body of the vehicle in addition to the at least one surrounding sensor;

the at least one surrounding sensor is further configured to:
memorize at least one first axis difference adjustment value which adjusts at least one first axis difference of the first detection axis relative to a predetermined first base detection axis;
produce the first surrounding information by adjusting the at least one first axis difference by the at least one first axis difference adjustment value; and
provide the at least one vehicle electronic control unit with information on the at least one first axis difference adjustment value memorized in the at least one surrounding sensor as first adjustment value information;

the at least one vehicle electronic control unit is configured to:
memorize the at least one first axis difference adjustment value included in the first adjustment value information provided from the at least one surrounding sensor; and
provide the at least one surrounding sensor with information on the at least one first axis difference adjustment value memorized in the at least one vehicle electronic control unit as the first adjustment value information; and the at least one surrounding sensor is further configured to memorize the at least one first axis difference adjustment value included in the first adjustment value information provided from the at least one vehicle electronic control unit when the at least one surrounding sensor is at least one replacement surrounding sensor and the at least one first axis difference adjustment value is not memorized in the at least one replacement surrounding sensor.

2. The vehicle driving assist apparatus as set forth in claim 1, wherein the at least one vehicle electronic control unit is further configured to periodically provide the at least one surrounding sensor with the first adjustment value information.

3. The vehicle driving assist apparatus as set forth in claim 1, wherein the at least one surrounding sensor is further configured to request to carry out an axis difference adjustment operation to memorize the at least one first axis difference adjustment value in the at least one surrounding sensor when (i) the at least one first axis difference adjustment value is not memorized in the at least one surrounding sensor, and (ii) the at least one vehicle electronic control unit does not provide the at least one surrounding sensor with the first adjustment value information.

4. The vehicle driving assist apparatus as set forth in claim 1, wherein the at least one surrounding sensor is configured to adjust the at least one first axis difference by adjusting a position of a coordinate system, based on the first detection axis to a position of a coordinate system, based on the predetermined first base detection axis by the at least one first axis difference adjustment value.

5. The vehicle driving assist apparatus as set forth in claim 1, wherein the at least one first axis difference includes at least one of (i) a difference in a pitch angle between the first detection axis and the predetermined first base detection axis, (ii) a difference in a yaw angle between the first detection axis and the predetermined first base detection axis, and (iii) a difference in a roll angle between the first detection axis and the predetermined first base detection axis.

6. The vehicle driving assist apparatus as set forth in claim 1, wherein:
the at least one surrounding sensor includes a camera sensor having an optical axis as the first detection axis; and
the camera sensor is configured to (i) take images of a view surrounding the vehicle within an area about the optical axis and (ii) detect the situation surrounding the vehicle as the first detected situation, based on the images taken by the camera sensor.

7. The vehicle driving assist apparatus as set forth in claim 1, wherein:
the at least vehicle electronic control unit is further configured to (i) detect the situation surrounding the vehicle as a second detected situation and (ii) produce information on the second detected situation as second surrounding information; and
the electronic control unit is configured to execute the driving assist control, based on the first surrounding information and the second surrounding information.

8. The vehicle driving assist apparatus as set forth in claim 7, wherein the at least one vehicle electronic control unit includes a radar sensor which detects the situation surrounding the vehicle as the second detected situation.

9. The vehicle driving assist apparatus as set forth in claim 8, wherein:
the radar sensor has a second detection axis and is further configured to:
detect the situation surrounding the vehicle as the second detected situation within an area about the second detection axis;
memorize at least one second axis difference adjustment value which adjusts at least one second axis difference of the second detection axis relative to a predetermined second base detection axis;
produce the second surrounding information by adjusting the at least one second axis difference by the at least one second axis difference adjustment value; and
provide the at least one surrounding sensor with information on the at least one second axis difference adjustment value memorized in the radar sensor as second adjustment value information;
the at least one surrounding sensor is configured to:
memorize the at least one second axis difference adjustment value included in the second adjustment value information provided from the radar sensor; and
provide the radar sensor with the second adjustment value information on the at least one second axis difference adjustment value memorized in the at least one surrounding sensor; and
the radar sensor is further configured to memorize the at least one second axis difference adjustment value included in the second adjustment value information provided from the at least one surrounding sensor when the radar sensor is a replacement radar sensor and the at least one second axis difference adjustment value is not memorized in the replacement radar sensor.

10. The vehicle driving assist apparatus as set forth in claim 9, wherein the radar sensor is configured to adjust the at least one second axis difference by adjusting a position of a coordinate system, based on the second detection axis to a position of a coordinate system, based on the predetermined second base detection axis by the at least one second axis difference adjustment value.

11. The vehicle driving assist apparatus as set forth in claim 9, wherein the at least one second axis difference includes at least one of (i) a difference in a pitch angle between the second detection axis and the predetermined second base detection axis, (ii) a difference in a yaw angle between the second detection axis and the predetermined second base detection axis, and (iii) a difference in a roll angle between the second detection axis and the predetermined second base detection axis.

12. The vehicle driving assist apparatus as set forth in claim 1, wherein:
the at least one surrounding sensor includes a first surrounding sensor having the first detection axis and mounted to the body of the vehicle at the predetermined first position, the first surrounding sensor being configured to (i) detect the situation surrounding the vehicle as the first detected situation within the area about the first detection axis and (ii) produce the information on the first detected situation as the first surrounding information;
the at least one vehicle electronic control unit includes a second surrounding sensor having a second detection axis and mounted to the body of the vehicle at a predetermined second position different from the predetermined first position, the second surrounding sensor being configured to (i) detect the situation surrounding the vehicle as a second detected situation within an area about the second detection axis and (ii) produce information on the second detected situation as second surrounding information; and
the electronic control unit is further configured to execute the driving assist control, based on the first surrounding information and the second surrounding information.

13. The vehicle driving assist apparatus as set forth in claim 12, wherein:
the second surrounding sensor is further configured to:
memorize at least one second axis difference adjustment value which adjusts at least one second axis difference of the second detection axis relative to a predetermined second base detection axis;
produce the second surrounding information by adjusting the at least one second axis difference by the at least one second axis difference adjustment value; and
provide the first surrounding sensor with information on the at least one second axis difference adjustment value memorized in the second surrounding sensor as second adjustment value information;
the first surrounding sensor is configured to:
memorize the at least one second axis difference adjustment value included in the second adjustment value information provided from the second surrounding sensor; and
provide the second surrounding sensor with information on the at least one second axis difference adjustment value memorized in the first surrounding sensor as the second adjustment value information; and
the second surrounding sensor is further configured to memorize the at least one second axis difference adjustment value included in the second adjustment value information provided from the first surrounding sensor when the second surrounding sensor is a replacement second surrounding sensor and the at least one second axis difference adjustment value is not memorized in the replacement second surrounding sensor.

14. The vehicle driving assist apparatus as set forth in claim 13, wherein the second surrounding sensor is configured to adjust the at least one second axis difference by adjusting a position of a coordinate system, based on the second detection axis to a position of a coordinate system, based on the predetermined second base detection axis by the at least one second axis difference adjustment value.

15. The vehicle driving assist apparatus as set forth in claim 13, wherein the at least one second axis difference includes at least on of (i) a difference in a pitch angle between the second detection axis and the predetermined second base detection axis, (ii) a difference in a yaw angle between the second detection axis and the predetermined second base detection axis, and (iii) a difference in a roll angle between the second detection axis and the predetermined second base detection axis.

16. The vehicle driving assist apparatus as set forth in claim 1, wherein the driving assist control is a control to automatically control one or more of acceleration of the vehicle, deceleration of the vehicle, and steering of the vehicle.

17. The vehicle driving assist apparatus as set forth in claim 1, wherein the at least one surrounding sensor is further configured to request to carry out an axis difference adjustment operation to memorize the at least one first axis difference adjustment value in the at least one surrounding sensor when (i) the at least one surrounding sensor is the at least one replacement surrounding sensor, (ii) the at least one first axis difference adjustment value is not memorized in the at least one surrounding sensor, and (iii) the at least one vehicle electronic control unit does not provide the at least one surrounding sensor with the first adjustment value information.

* * * * *